United States Patent
Perlman et al.

(10) Patent No.: US 11,436,345 B2
(45) Date of Patent: Sep. 6, 2022

(54) PROTECTION OF SECRET CLIENT DATA IN A MULTIPLE CLIENT DATA DEDUPLICATION ENVIRONMENT

(71) Applicant: EMC IP Holding Company, LLC, Hopkinton, MA (US)

(72) Inventors: Radia J. Perlman, Redmond, WA (US); Charles W. Kaufman, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 272 days.

(21) Appl. No.: 16/803,152

(22) Filed: Feb. 27, 2020

(65) Prior Publication Data

US 2021/0271763 A1 Sep. 2, 2021

(51) Int. Cl.
| | | |
|---|---|---|
| G06F 21/60 | (2013.01) | |
| H04L 9/06 | (2006.01) | |
| H04L 9/32 | (2006.01) | |
| G06F 21/62 | (2013.01) | |
| H04L 9/40 | (2022.01) | |
| G06F 16/215 | (2019.01) | |
| H04L 9/14 | (2006.01) | |

(52) U.S. Cl.
CPC .......... *G06F 21/602* (2013.01); *G06F 16/215* (2019.01); *G06F 21/62* (2013.01); *H04L 9/0618* (2013.01); *H04L 9/14* (2013.01); *H04L 9/3236* (2013.01); *H04L 63/102* (2013.01); *G06F 2221/2149* (2013.01)

(58) Field of Classification Search
CPC ...... G06F 21/602; G06F 16/215; G06F 21/62; G06F 2221/2149; G06F 21/57; G06F 21/6245; H04L 9/0618; H04L 9/14; H04L 9/3236; H04L 63/102; H04L 9/0643; H04L 9/0894
USPC ......................................................... 713/164
See application file for complete search history.

(56) References Cited

U.S. PATENT DOCUMENTS

| | | | | |
|---|---|---|---|---|
| 2010/0268960 | A1* | 10/2010 | Moffat | H04L 9/0643 713/181 |
| 2014/0025948 | A1* | 1/2014 | Bestler | H04L 9/0863 713/167 |
| 2019/0073152 | A1* | 3/2019 | Nagle | H04L 9/0894 |
| 2019/0197260 | A1* | 6/2019 | Wang | G06F 21/57 |
| 2021/0266329 | A1* | 8/2021 | Fuhry | H04L 63/101 |

* cited by examiner

*Primary Examiner* — Jacob Lipman
(74) *Attorney, Agent, or Firm* — Barry N. Young

(57) ABSTRACT

In a cloud-based multiple client encryption and deduplication environment, secret plaintext data of a client is encrypted to produce ciphertext in an enclave comprising a trusted execution environment which is inaccessible by unauthorized entities and processes even with administrator privileges. Encryption is performed with an initialization vector and an encryption key calculated in the enclave. The encrypted ciphertext is deduplicated prior to storage by comparing a hash of the corresponding plaintext data to hashes of previously stored plaintext data.

17 Claims, 3 Drawing Sheets

PROTECTION OF SECRET CLIENT DATA IN A MULTIPLE CLIENT DATA DEDUPLICATION ENVIRONMENT

BACKGROUND

This invention relates generally to data deduplication in secure data storage systems, and more particularly to deduplication and protection of client-specific secret data in a multiple client data deduplication and storage environment.

Data deduplication ("DDUP") involves eliminating duplicate copies of data to reduce storage resource requirements, network transmission time and bandwidth, and the amount of data exchanged between a client and a storage system in order to reduce costs and improve performance. DDUP is particularly useful for systems that hold many versions of similar files, such as systems that periodically create a backup copy of data where most of the data has not changed.

Storage systems are becoming larger, more distributed and cloud-based, and typically store primary and backup data of multiple clients, some of which may be in the same DDUP domain. This means the client data of individual clients can be duplicate data of other clients in the same domain and will be DDUP'ed with that of the other clients in the same domain and stored together. Some of this data may comprise client-specific private or sensitive confidential information (secret data) that needs to be protected from access by other clients or applications. Thus, the client-specific plaintext data of individual clients (or of a group of clients which are members of a common domain) may be encrypted using the same or a different encryption key for each individual client or each domain. Protecting access to the encryption keys protects the secret data of a client from other clients which are not members of the domain, careless users or malicious applications which cannot access the secret data without the encryption key.

Deduplication must ordinarily be done on plaintext data rather than encrypted data. Encryption will normally prevent deduplication of the encrypted data because if the same data is encrypted twice, even with the same key, the ciphertext will be different. Thus, with traditional approaches, data may be encrypted at its source, rather than encrypted at a storage system following DDUP. Transmitting to or maintaining plaintext data at a storage location can expose the unprotected secret plaintext data to exploitation by unauthorized users or entities during transmission from the client to the storage system as well as at the storage system prior to encryption. Although it is possible to encrypt the client-specific data prior to transmission, decrypt the encrypted data prior to DDUP, and re-encrypt the data for storage, this requires the server at the storage location to have access to all encryption keys. For the reasons stated above, it is undesirable to make encryption keys available to a server to decrypt client-specific encrypted data for deduplication because this can compromise data security. Moreover, it requires protection of individual keys for clients which can be inefficient and burdensome. Moreover, it creates problems in adding new clients to the domain as well as in updating encryption keys for key rollover.

It is possible for a client to create a hash of plaintext, encrypt the plaintext to create ciphertext and send the hash and ciphertext to the server. The server may then DDUP the ciphertext by comparing the hash to previously stored hashes without access to the decryption key and the necessity for decrypting the ciphertext. However, if all clients in a group use the same encryption keys, a malicious attacker client can compute a hash of a block it knows that a second client will store, and store the hash with garbage for the ciphertext or with an encrypted malware. Then when the second client attempts to store the original block, that block will be discarded as being a duplicate block. When the second client or another client attempts to read back the original block, the substituted attacker-supplied block will be returned instead. This attacks the integrity of the original data block, and malicious applications can create significant problems for an enterprise. Thus, there is a need to protect the integrity of stored data from other clients in the same domain.

It is desirable to provide systems and methods for protection, deduplication and storage of client-specific secret data that address and overcome these and other problems with known data DDUP and storage systems, and it is to these ends that the invention is directed.

DESCRIPTION OF PREFERRED EMBODIMENTS

The invention is particularly well adapted to be used with cloud-based deduplication (DDUP), storage and backup systems, and will be described in that context. As will be appreciated, however, this is illustrative of only one utility of the invention, and that the invention has applicability to other types of systems and uses.

Figure 1:
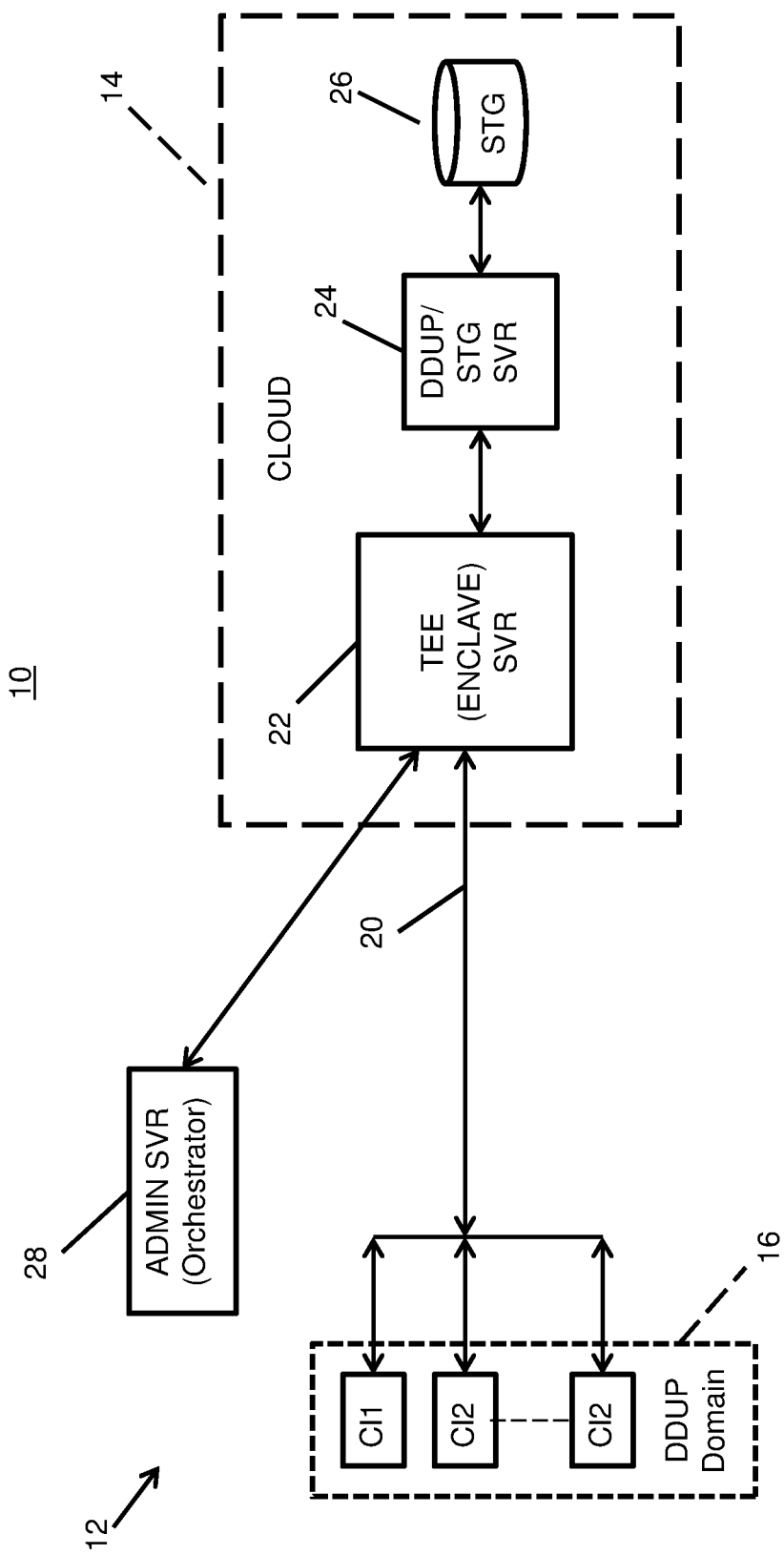
FIG. 1 is a functional block diagram illustrating an overview of a system in accordance with an embodiment of the invention.

FIG. 1 is a functional block diagram that illustrates an overview of the architecture of a system 10 embodying the invention. System 10 may comprise a distributed processing and storage system of an enterprise that performs remote deduplication and storage of source data from a client-side subsystem 12 comprising a plurality of clients CI1, CI2, . . . CIn which is conveyed as a stream of transmission-secured data from the client-side subsystem over a secure communications network to a backend subsystem 14 for encryption, DDUP and storage. In an embodiment, the backend subsystem 14 may be located in a cloud. The plurality of clients CI1, CI2, . . . CIn may be grouped into one or more common ensembles forming one or more DDUP domains 16 (only one DDUP domain being shown in the figure) from which the data processed by the individual clients may be DDUP'ed against data processed by other clients in the same or other domains before storage, as will be described.

The clients at the client-side subsystem may comprise servers, workstations or data center computers, for example, having processors and memory embodying executable instructions that control the processors to perform the operations described herein. The clients may run applications and communicate to the backend subsystem plaintext data blocks comprising client-specific sensitive or private confidential information (secret data) that needs to be protected from unauthorized disclosure. The communications network channel 20 may be a part of a public or private data communications network that interconnects the client-side subsystem 12 with the backend subsystem 14, and may secure and protect the plaintext blocks communicated to the backend system using TLS, SSL or another form of known transmission level security to protect communicated sensitive information during transmission.

The backend subsystem 14 may comprise a server 22 that implements an enclave and one or more other servers 24 for DDUP and storage processing. Server 22 may comprise a processor, for instance, a virtual machine, and associated memory that stores executable instructions that control the processor to perform the operations as described herein. Server 22 may implement and provide an "enclave" comprising a trusted execution environment ("TEE") which may be created by a processor of the server executing a set of CPU instructions to create protected areas in the address space of software applications in which the applications can work with sensitive private (secret) client information with confidentiality and integrity. The TEE enclave affords a secure application-level processing environment that provides enhanced security and protection for application software and for secret application information and processing data. The TEE enclave may be hardware-based, software-based or based upon a combination of hardware and software. The TEE enclave may implemented, for instance, by Intel® Software Guard Extension ("SGX") technology, by ARM® TrustZone security extension technology, by Google® Asylo open source framework or by Microsoft® Azure confidential computing technology, among others. The TEE enclave comprises protected areas in an application's address space that provide confidentiality and integrity from malware and from applications running with higher privileges, including the processor operating system. It enables software applications to work in a secure protected environment with private or secret information, such as passwords, account numbers, financial information, encryption keys, health records, etc., intended to be accessed only by an authenticated recipient. Applications executing in the enclave preferably calculate encryption keys, calculate initialization vectors and encrypt/decrypt data. Intel® SGX is a preferred embodiment for implementing an enclave in accordance with the invention. SGX is a chip feature that may be initialized to implement an enclave to afford a secure area of chip memory in which a user-level process may be installed, and afford a secure processing core that is inaccessible by the operating system, a hypervisor, or an administrator with root privileges. The enclave may be initialized by a remote processor, as by an administrative server/orchestrator 28 located, for example, at the client-side subsystem 12. The enclave may attest to the code that was loaded, store authentication certificates, authenticate users seeking access, and hide private secret information such as initialization vectors and encryption keys and prevent access by unauthorized entities.

Enclave 22 receives blocks of plaintext data from clients following authentication of the clients by the secure communications channel 20, preferably calculates a hash of each block of plaintext, and encrypts the plaintext data block, as by using Galois Counter Mode (GCM) encryption, for instance, or another symmetric encryption approach. Processes initialized and running in the enclave may calculate different versions of encryption keys and initialization vectors, and perform encryption and decryption of data blocks using the keys. Keys may be individualized and be different for each different client, or for each DDUP domain. Keys may be changed periodically to different key versions and new keys may be added to encrypt new client data. Thus, individual client-specific information may be protected from other clients, and previously stored client-specific information may be re-encrypted using a different newer key version (key rollover) to provide additional security. Key rollover may be accomplished by calculating the new keys in the enclave. Clients need not know, and preferably do not know, any of the keys or even the key version number of a key being used. Upon being authenticated, clients may send data to the enclave for encryption and storage and if authorized receive data from the enclave upon request.

As stated, the backend subsystem may additionally comprise one or more other servers 24, comprising processors and memory that embody executable instructions that control the operation of the processors to DDUP plaintext data blocks received via communications channel 20, and to store the DDUP'ed data blocks as encrypted ciphertext blocks in secure storage 26 which may comprise one or more hard disks, for example. Deduplication of encrypted ciphertext blocks may be performed without the necessity of decrypting the ciphertext blocks by comparing the calculated hashes of the corresponding plaintext blocks to previously computed hashes of plaintext data blocks stored in a table. If the hash of a plaintext block is new, it is an indication that the plaintext block is not a duplicate, and the server may store the corresponding ciphertext block in storage 26. If, however, the hash already exists in the table, indicating that the stored ciphertext corresponding to the plaintext block possibly may correspond to a duplicate of plaintext data that has already been encrypted and stored, the server may either discard and not write ciphertext block to storage, or determine whether to overwrite the previously stored data block, as will be described.

Server 24 may operate, for example, as both a deduplication appliance to DDUP the received data blocks, and as a storage server to store and retrieve DDUP'ed ciphertext blocks in storage. Deduplication also may be performed, for instance, by a separate DataDomain deduplication appliance of Dell EMC. Ciphertext blocks may be stored with associated unique characteristic metadata such as initialization vectors and key version numbers (without the actual keys which may be stored in the enclave) used to create the ciphertext blocks. Encryption of plaintext as ciphertext protects the plaintext from unauthorized access by the storage server.

In accordance with the invention, the enclave may choose a unique initialization vector (IV) for combining with the plaintext before creating the encrypted block of ciphertext. The initialization vector may be, for example, either a random or pseudorandom non-repeating primitive, such as a number used once (nonce) which is combined with plaintext prior to encryption to randomize the plaintext. As will be described, a unique initialization vector may created and used with each block of plaintext.

Figure 2:
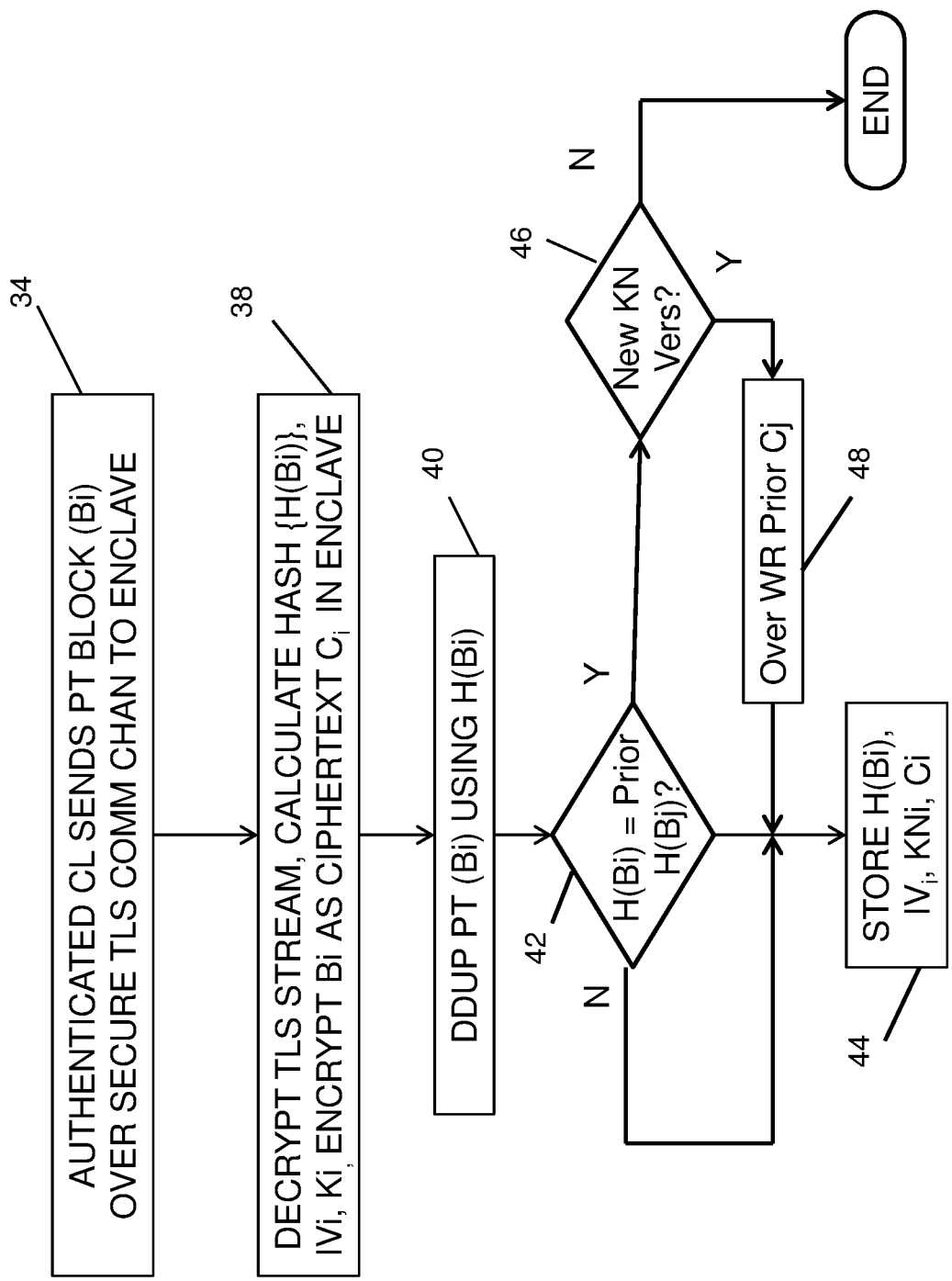
FIG. 2 is a functional block diagram illustrating a process in accordance with an embodiment of the invention for DDUP'ing and storing encrypted data.

FIG. 2 illustrates a process in accordance with one embodiment of the invention for encrypting, deduplicating and storing a block of write data in backend storage received from an authenticated client via communications channel 20. TLS authenticates a client in setting up the communications channel for the client, so that all clients communicating with server 22 have previously been authenticated. Referring to the figure, at 34 the backend subsystem 14 (FIG. 1) may receive a block B; of private (secret) client plaintext (PT) data produced, for instance, by an executing application, that the client wishes to protect and store in remote backend storage 26, such as for instance in the cloud. The client may send the block of plaintext over the secure TLS channel 20 to the backend subsystem 14 where it is received by the enclave 22 that was previously initialized by the administrative server 28. The client is authenticated by the TLS channel when the connection is established, so that enclave is aware that the client is authorized.

At 38 the enclave may create a hash $H(B_i)$ of the block of plaintext data by applying to the plaintext data a hash function H that deterministically produces a unique hash value. Any of a number of known hash functions that produce a unique non-repeating hash of the plaintext may be used. The enclave may also create an initialization vector $IV_i$, as previously described, for each block of plaintext, and an encryption key $K_i$ that is common to all of the clients in each DDUP domain. The enclave may combine the block of plaintext with its initialization vector $IV_i$ to randomize the plaintext, and encrypt the block of plaintext data using the data encryption key $K_i$ to create a corresponding block of ciphertext $C_i$. A new different $IV_i$ is preferably created and used for each plaintext block encrypted, and a new unique key $K_i$ is preferably created for and shared by each different DDUP domain. Thus, each DDUP domain may have its own set $IV_i$, $K_i$ pairs. Encryption enables secret client-specific data to be protected from access by the storage system other clients. Also, in some embodiments, either a different IV and/or a different encryption key may be used to encrypt each individual block or group of blocks of plaintext data of a single client.

At 40, DDUP may be performed by comparing the hash of the block of plaintext $H(B_i)$ to previously calculated hashes that are stored in a hash table, in storage 26, for example. At 42, if the hash $H(B_i)$ does not match a previous hash $H(Bj)$ in the hash table, the corresponding block of ciphertext $C_i$ may be stored at 44 in storage 26, preferably associated with metadata such as its hash $H(B_i)$, its initialization vector IV; and its key version number KN. If instead at 42, the hash $H(B_i)$ matches a previous hash $H(B_j)$, further scrutiny and tests may be performed before deciding to store ciphertext $C_i$. These may include, for example, determining at 46 whether the stored previous matching hash $H(B_j)$ is associated with an earlier key number version number than a newer key version number that associated with the current hash $H(B_i)$. If so, at 48 the previous ciphertext block Cj corresponding to the block $B_j$ may be overwritten in storage with ciphertext block $C_i$. Otherwise, if the key version numbers are the same at 46, ciphertext block $C_i$ may be deemed to be a duplicate of previously stored data and not stored.

The process of FIG. 2 may be repeated block-by-block for each new block of plaintext data received at the backend subsystem, to effectively deduplicate the received data prior to storage while protecting the data with an evolving encryption process. The enclave may periodically on its own initiative or according to predetermined criteria update and rollover encryption keys to new versions, and may re-encrypt and re-store blocks of the data for added protection. Since all keys are maintained only by the enclave and protected from access even by entities with root privileges, and keys are not stored in backend storage with the encrypted data, the data is protected even if an unauthorized entity or malicious application obtains access to the backend storage. Using different initialization vectors for each block of plaintext data insures data integrity since the corresponding blocks of ciphertext are inaccessible to other clients.

Figure 3:
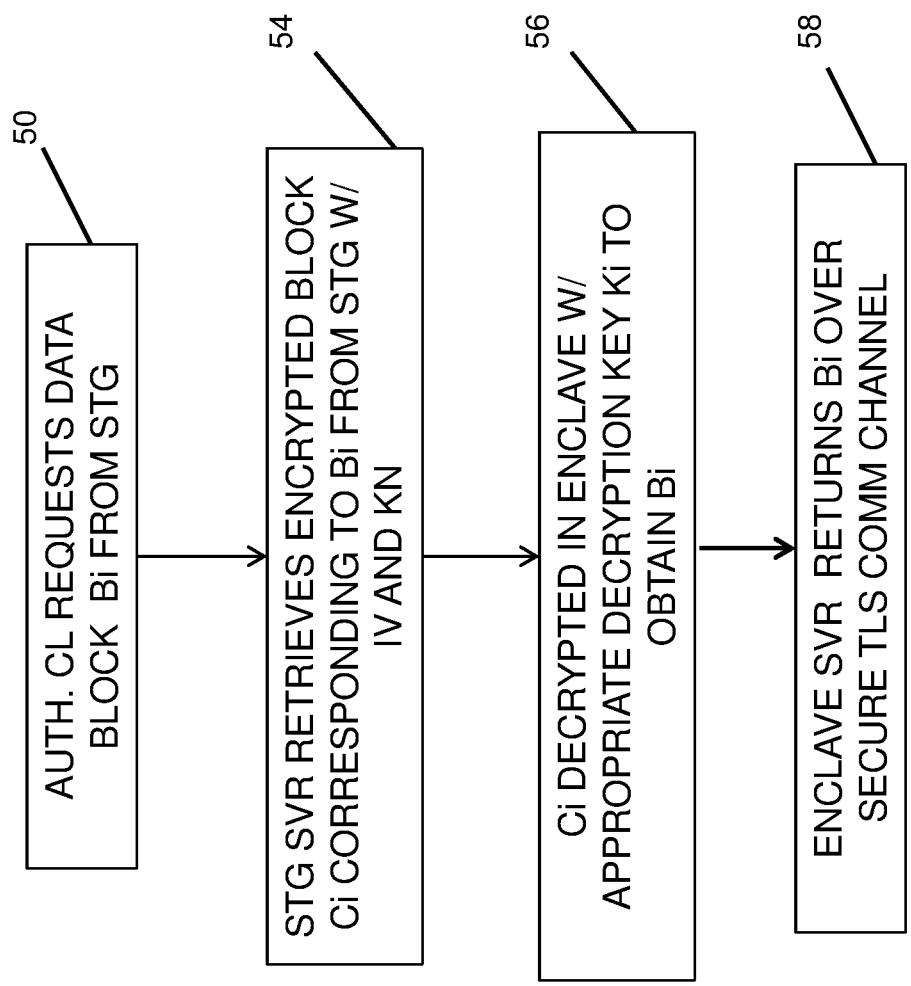
FIG. 3 is a functional block diagram illustrating a process in accordance with an embodiment of the invention for retrieving encrypted data from storage and returning the data unencrypted.

FIG. 3 illustrates a process in accordance with the invention for retrieving encrypted data from storage in response to a request from a client, decrypting the data, and returning the decrypted data to the client. Referring to the figure, at 50 a client authenticated by the TLS communications channel requests a data block $B_i$ from storage. At 54, the storage server retrieves the block of ciphertext $C_i$ corresponding to the requested block $B_i$, along with its associated metadata, such as its initialization vector IV and its key version number KN. At 56, the encrypted ciphertext block $C_i$ is decrypted in the enclave using the appropriate decryption key to obtain plaintext $B_i$, and at 58 the enclave returns the plaintext block $B_i$ over the secure TLS communications channel to the requesting client.

As may be appreciated, the invention enables an enterprise to improve the efficiency and reduce data storage costs while protecting and maintaining the confidentiality of the sensitive client-specific data from unauthorized access by enabling deduplication and storage of encrypted sensitive client data and protection of decrypted data during transfer by transferring the data over a secure network.

It will also be appreciated that while the foregoing has been with reference to particular embodiments of the invention, changes to these embodiments may be made without departing from the principles of the invention as defined by the appended claims.

The invention claimed is:

1. A method of deduplicating and protecting secret client data in a multiple client data deduplication and storage environment, comprising:
   receiving in an enclave a block of secret plaintext data from a client, said enclave comprising a trusted execution environment which provides protected areas in an address space of an application executing in a processor in said enclave for processing confidential information intended to be accessed only by a designated recipient, and which enclave is inaccessible by unauthorized entities and other processes even those having administrative privileges;
   combining in said enclave an initialization vector that is unique to said received block of secret plaintext data with said received block of secret plaintext data to individualize said received block of secret plaintext data;
   encrypting the received block of secret plaintext data combined with its said unique initialization vector using a key that is calculated in said enclave by said application to produce a corresponding ciphertext block, said key being unique and individualized to said client, and storing said initialization vector and said key inside said enclave to prevent access to said initialization vector and key by entities outside of said enclave;
   deduplicating said ciphertext block against previously stored ciphertext by using the block of received plaintext data that produced said ciphertext block; and
   storing said deduplicated ciphertext block in the absence of previously stored ciphertext corresponding to said block of received plaintext data.

2. The method of claim 1 further comprising maintaining protected in said enclave from access encryption keys used to encrypt plaintext data to produce ciphertext data.

3. The method of claim 1 further comprising receiving a request from a requesting client for a block of plaintext data, verifying that the requesting client is authorized to receive the requested plaintext data, and, upon confirming authorization, retrieving from storage a block of ciphertext corresponding to the requested plaintext data, decrypting the retrieved block of ciphertext to produce the requested plaintext data, and returning to the requesting client the requested plaintext data.

4. The method of claim 1, wherein said receiving comprises receiving from said client said plaintext data at said enclave via a secure transmission level secured communications channel, and wherein the multiple clients are in one or more deduplication domains in which data of said clients in one deduplication domain are deduplicated against data of other clients in said deduplication domain.

5. The method of claim 1 further comprising calculating a hash of data in said block of received plaintext data, and wherein said deduplicating comprises comparing said hash against hashes of previously received plaintext blocks, and, upon detecting a matching hash, further comparing metadata associated with said block of ciphertext corresponding to said block of received plaintext data to previous metadata associated with a previously received plaintext block having said matching hash, and upon said compared metadata being different, said storing comprises storing said block of ciphertext.

6. The method of claim 5, wherein said comparing metadata comprises determining whether a key version of a key used to encrypt said previously received block of plaintext data is different from a key version used to encrypt said block of received plaintext data, and upon determining that the key versions are different, said storing comprises overwriting in storage a block of ciphertext corresponding to said previously received block of plaintext data with said block of ciphertext corresponding to said block of received plaintext data.

7. The method of claim 5, wherein upon there being no matching hashes, storing the block of ciphertext corresponding to the received plaintext data block as non-duplicated data, and storing with said block of ciphertext said metadata associated with said block of ciphertext.

8. The method of claim 5, wherein said metadata comprises an identifier of a key version and said initialization vector that were used to encrypt the corresponding block of received plaintext data to produce said block of ciphertext.

9. A method of deduplicating and protecting private client data in a remote multiple client data deduplication and storage environment, comprising:
encrypting private plaintext data of a client in an enclave to produce corresponding ciphertext, said enclave comprising a trusted execution environment providing protected areas for private client data in an address space of applications executing in said enclave, said address space being inaccessible except to designated entities and processes, said encrypting comprising combining an initialization vector that is unique to said private plaintext data with said private plaintext data to individualize said private plaintext data, and encrypting said private plaintext data combined with said unique initialization vector using a key that is calculated in said enclave, said key being unique and individualized to said client, and storing said initialization vector and said key in said enclave to prevent access to said initialization vector and key by entities outside of said enclave;
calculating a hash of said private plaintext data;
deduplicating said private plaintext data against previous ciphertext produced from other plaintext data by comparing said calculated hash to previously calculated hashes of said other plaintext data; and
upon determining that said private plaintext data is not duplicate data, storing said ciphertext corresponding to said deduplicated private plaintext data.

10. The method of claim 9, wherein said client is a member of an ensemble of multiple clients that comprise a common deduplication domain, and said deduplicating comprises deduplicating said plaintext data against ciphertext produced from plaintext data of one or more of said multiple clients in said common deduplication domain.

11. The method of claim 9, wherein said enclave has access to credentials for verifying clients which are authorized to send plaintext data to said enclave for encryption, deduplication and storage, and said method further comprises verifying a client before receiving, encrypting, deduplicating and storing plaintext data from such client.

12. The method of claim 9, wherein said encrypting and deduplicating comprises encrypting and deduplicating compressed plaintext data from a client.

13. Computer readable non-transitory storage medium embodying executable instructions for controlling the operation of a processor to perform a method of deduplicating and protecting private client data in a remote data deduplication and storage environment, comprising:
initializing an enclave in said remote environment, said enclave comprising a trusted execution environment providing protected areas for private client data in an address space of applications executing in said enclave, said address space being inaccessible except to designated entities and processes;
encrypting in said enclave plaintext data of a client to produce corresponding ciphertext, said encrypting comprising combining an initialization vector that is unique to said private plaintext data with said private plaintext data to individualize said private plaintext data, and encrypting said private plaintext data combined with said unique initialization vector using a key that is calculated in said enclave, said key being unique and individualized to said client, and storing said initialization vector and said key in said enclave to prevent access to said initialization vector and key by entities outside of said enclave;
calculating a hash of said plaintext data;
deduplicating said corresponding ciphertext against previous ciphertext produced from other plaintext data by comparing said calculated hash to previously calculated hashes of said other plaintext data; and
upon determining that said plaintext data is not duplicate data, storing said corresponding ciphertext of said deduplicated private plaintext data.

14. The computer readable non-transitory storage medium of claim 13, wherein said enclave has access to credentials for verifying clients which are authorized to send plaintext data to said enclave for encryption, deduplication and storage, and further comprising verifying a client before receiving, encrypting, deduplicating and storing plaintext data from such client.

15. The computer readable non-transitory storage medium of claim 13 further comprising receiving a request from a client for a block of plaintext data, verifying that the requesting client is authorized to receive the requested plaintext data, and, upon the client being authenticated, retrieving from storage a block of ciphertext corresponding to the requested plaintext data, decrypting the retrieved block of ciphertext to produce the requested plaintext data, and returning to the requesting client the requested plaintext data.

16. The computer readable non-transitory storage medium of claim 13, wherein said deduplicating comprises comparing said calculated hash against said previously calculated hashes and, upon detecting a matching hash, determining whether the associated ciphertext that was produced with a different version of an encryption key than a key version used for said encrypting said plaintext data, and, if so, replacing said associated ciphertext and said previously stored metadata corresponding to said matching hash with said hash.

17. The computer readable non-transitory storage medium of claim 16, wherein said client is a member of an ensemble of multiple clients that comprise a common deduplication domain, and said deduplicating comprises deduplicating said plaintext data against ciphertext produced from plaintext data of one or more of said multiple clients in said common deduplication domain using said hashes.

* * * * *